(No Model.)

C. EIBEE.
COUPLING AND CLOSING PIPES.

No. 590,056. Patented Sept. 14, 1897.

WITNESSES:
Chas L Nitch
Chester Higgins

INVENTOR
Carl Eibee
BY Clarence L Burger
ATTORNEY.

UNITED STATES PATENT OFFICE.

CARL EIBEE, OF NEW YORK, N. Y.

COUPLING AND CLOSING PIPE.

SPECIFICATION forming part of Letters Patent No. 590,056, dated September 14, 1897.

Application filed February 17, 1897. Serial No. 623,811. (No model.)

*To all whom it may concern:*

Be it known that I, CARL EIBEE, a citizen of the United States, residing in the city, county, and State of New York, have invented a new and useful Improvement in Means for Coupling and Closing Pipes; and I do hereby declare that the following is a full, clear, and exact description of the same.

My invention relates to couplings for flexible hose and other pipes, and among its objects are to make a coupling which is simple in form, is readily joined, is tight and secure when connected, and can be readily disconnected; also, to provide means for locking and unlocking the coupling and for facilitating the uncoupling operation. I attain these ends by certain novel features of construction in the coupling-heads and by the combination therewith of certain instrumentalities which, in order that the invention may be clearly ascertained, I shall first describe in detail, and then point out particularly in the claims.

Reference is to be had to the accompanying drawings, forming part of this specification, in both of which like parts are designated by the same letters.

Figure 1:
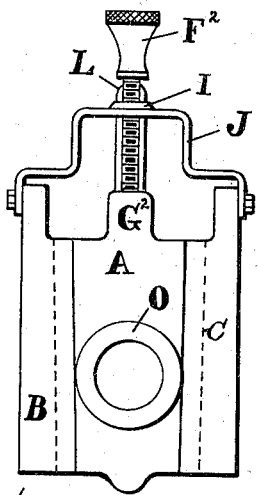
Figure 2:
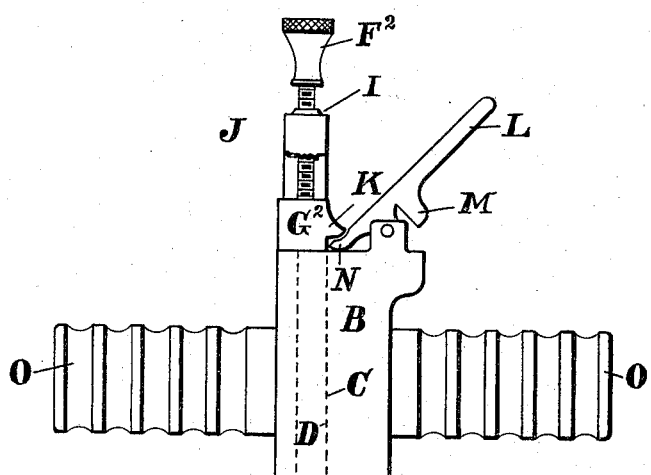

Figure 1 is an end view of a pipe-coupling with a locking device and an uncoupling device embodying my invention. Fig. 2 is a side view of the same.

I have shown both coupling-heads A and B, provided with corrugated necks O for connection with a flexible tube, hose, or pipe by the ordinary exterior wrapping of wire, or in any other suitable manner. It will appear, however, that the coupling-heads A and B may be formed on a rigid pipe, or otherwise variously connected to either a rigid or flexible pipe.

I make the coupling by forming across the face and bore of one coupling-head, as B, a T-shaped, dovetail, or other inwardly-expanded groove C, and across the face and bore of the other coupling-head, as A, a corresponding T-shaped, dovetail, or other inwardly-contracted tongue D to slide and fit transversely in the groove C, and thus securely lock the coupling-heads together and permit the ready uncoupling by simply withdrawing the tongue D transversely of the pipe, but lengthwise of itself, from the groove C. To make this coupling more tight, I prefer to make both the tongue D and groove C longitudinally and correspondingly tapering, so that the tongue will become closely seated in the groove when the bores of the coupled heads are in exact alinement, and thus make a perfectly tight coupling. The taper of the tongue and groove also permits their ready separation when once started, as by a blow or an initial thrust.

To lock the coupling-heads A and B together, I have shown a screw-bolt $F^2$, working in a nut I on a bail-arm J, which is pivoted to opposite sides of one head, as B, so that when the heads are uncoupled the arm J can be swung over a locking-shoulder $G^2$ on the other head A, and the bolt $F^2$ screwed down upon said shoulder to lock and tighten the tapering tongue in the groove and thus make an exceptionally tight joint. In uncoupling the screw-bolt $F^2$ is retracted by unscrewing it from the shoulder $G^2$, and the arm J swung downward, thus leaving the head A free to be uncoupled; but any other suitable form of locking device may be used, if preferred.

To start and facilitate the uncoupling, I provide a withdrawing-nose K on the head A and pivot to the head B a withdrawing handle-lever L, having a stop-shoulder M to limit its downward movement and a recess N to receive the withdrawing-nose K. The lever L acts on the inner shoulder of the nose K, and by its leverage serves to readily start the tongue D from the groove C, after which the heads are readily uncoupled.

I claim—

1. The pipe-coupling which comprises coupling-heads respectively provided with an inwardly-expanded transverse groove and a transverse tongue, in combination with means for locking the tongue in the groove, and means for withdrawing the tongue from the groove.

2. The pipe-coupling which comprises coupling-heads respectively provided with an inwardly-expanded transverse groove and a transverse tongue, one head having a withdrawing-shoulder, in combination with the instrumentality herein described as a withdrawing-lever pivoted to the other head, and acting on said shoulder in a direction lengthwise of the tongue and groove.

3. The pipe-coupling which comprises coupling-heads respectively provided with an inwardly-expanded, longitudinally-tapering transverse groove, and a longitudinally-tapering transverse tongue, in combination with the instrumentalities herein described as a nut attached to one head and a screw-bolt working in said nut to bear on a shoulder on the other head in a direction lengthwise of the tapering tongue and groove.

4. The pipe-coupling which comprises coupling-heads respectively provided with an inwardly-expanded, longitudinally-tapering transverse groove, and a longitudinally-tapering transverse tongue, in combination with the instrumentalities herein described as a nut connected to one head, and a screw-bolt working in said nut to bear on a locking-shoulder on the other head, and a withdrawing-lever pivoted to one head to bear on a withdrawing-shoulder on the other head.

In testimony whereof I have hereunto set my hand the 17th day of December, 1896.

CARL EIBEE.

In presence of—
CLARENCE L. BURGER,
HENRY A. RUBINO.